(12) United States Patent
Chhabra et al.

(10) Patent No.: US 9,026,099 B2
(45) Date of Patent: May 5, 2015

(54) MECHANISMS TO IMPROVE MOBILE DEVICE ROAMING IN WIRELESS NETWORKS

(75) Inventors: Kapil Chhabra, Milpitas, CA (US); Saravanan Balasubramaniyan, Los Gatos, CA (US); Tito Thomas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 13/315,144

(22) Filed: Dec. 8, 2011

(65) Prior Publication Data

US 2013/0150012 A1 Jun. 13, 2013

(51) Int. Cl.
*H04M 3/00* (2006.01)
*H04W 48/16* (2009.01)

(52) U.S. Cl.
CPC ............................. *H04W 48/16* (2013.01)

(58) Field of Classification Search
USPC ........... 455/418, 423, 424, 425, 432.1, 432.2, 455/423.3, 435.1, 435.2, 435.3, 436, 437, 455/438, 439, 440, 441, 442, 443, 444, 455/452.1, 452.2, 453, 515, 552.1; 370/252, 328, 331, 332, 338
See application file for complete search history.

(56) References Cited

U.S. PATENT DOCUMENTS

| 7,383,046 | B2 | 6/2008 | Jagadeesan et al. | |
| 2007/0140188 | A1* | 6/2007 | Melkote et al. | 370/338 |
| 2007/0147317 | A1* | 6/2007 | Smith et al. | 370/338 |
| 2007/0260711 | A1 | 11/2007 | Gupta et al. | |
| 2008/0137626 | A1 | 6/2008 | Choi et al. | |
| 2009/0191915 | A1 | 7/2009 | Abramson et al. | |
| 2009/0323638 | A1 | 12/2009 | Catovic et al. | |
| 2010/0049844 | A1* | 2/2010 | Ikeda | 709/223 |
| 2010/0097982 | A1* | 4/2010 | Eichenberger et al. | 370/328 |
| 2010/0255837 | A1* | 10/2010 | Kuo et al. | 455/433 |
| 2010/0265885 | A1* | 10/2010 | Umeuchi et al. | 370/328 |
| 2011/0026492 | A1 | 2/2011 | Frenger et al. | |
| 2012/0225649 | A1* | 9/2012 | Yerrabommanahalli et al. | 455/434 |

FOREIGN PATENT DOCUMENTS

KR 10-2005-0039302 A 4/2005

OTHER PUBLICATIONS

International Search Report and Written Opinion for PCT Application No. PCT/US2012/058619, dated Mar. 25, 2013.

* cited by examiner

*Primary Examiner* — Mahendra Patel
*Assistant Examiner* — Edd Rianne Plata
(74) *Attorney, Agent, or Firm* — Womble Carlyle Sandridge & Rice, LLP

(57) ABSTRACT

A mobile wireless device adapts roaming parameters used to determine searching for and switching among access points. The roaming parameters are adjusted based on a wireless network characterization for access points that includes a detected wireless network type. In an embodiment, the wireless network type is characterized by a service set identifier and a number of unique basic service set identifiers associated with the service set identifier per radio frequency band. Roaming parameters include a scan threshold, a roam threshold and a time interval between successive scans.

16 Claims, 14 Drawing Sheets

MECHANISMS TO IMPROVE MOBILE DEVICE ROAMING IN WIRELESS NETWORKS

TECHNICAL FIELD

The described embodiments generally relate to methods and apparatuses for adapting roaming for mobile wireless devices. More particularly, the present embodiments describe improving roaming based on adapting roaming parameters based on measured and determined wireless network characteristics.

BACKGROUND

Mobile wireless devices have evolved from providing analog circuit switched voice alone to offering a wide variety of digital services including voice, data and video that can be communicated through multiple different wireless networks. A "smart phone" mobile wireless device can provide many of these services through different mechanisms on different wireless networks, and a user of the mobile wireless device can expect similar quality of service whether provided through a circuit switched cellular connection, a packet switched cellular connection or a packet switched wireless local area network connection. Certain services can require high performance real-time quality of service characteristics to offer a suitable user experience, such as persistence of a connection for a voice call or a high quality frame rate for a video call. As the quality of a connection for a mobile wireless device can vary based on position of, interference received by and movement of the mobile wireless device and as several different connection points can be simultaneously available to the mobile wireless device, shifting an active connection between different connection points within or across wireless networks can impact quality of service. The shifting of connections between connection points can be referred to as handoff in cellular networks and as roaming in wireless local area networks. Cellular network handoff can be controlled by the cellular infrastructure, while wireless network roaming can be controlled by the mobile wireless device and in some cases by the wireless infrastructure.

Roaming in a wireless local area network can occur when a mobile wireless device moves its association from one access point to another access point in the wireless local area network. The mobile wireless device can determine when to search for alternative access points, what criteria to use to evaluate suitability of alternative access points to which to roam, and what thresholds to meet in order to roam to an alternative access point. Unlike handoff in cellular networks that can be specified in communication protocol standards and controlled by the cellular infrastructure, roaming in wireless local area networks can use proprietary methods executed in the mobile wireless device. The mobile wireless device can use a number of different performance criteria to determine when to roam among different access points in wireless local area networks. Access points can transmit and receive on one of several different radio frequency channels available in a radio frequency band, and different access points can use different radio frequency channels. The mobile wireless device can choose to switch between difference radio frequency channels used by the same access point or to a different access point.

In order to evaluate an alternative access point, the mobile wireless device can tune its own receiver to the transmitting radio frequency channel used by the alternative access point. While receiving signals transmitted by the alternative access point on a different radio frequency channel, the mobile wireless device can be unable to receive transmissions from a current access point to which the mobile wireless device is associated or connected. By interrupting current connections to roam, the search for alternative access points can affect data throughput performance between the mobile wireless device and the current access point. In addition, roaming can consume limited battery power when the mobile wireless device is associated with an access point but otherwise idle (i.e. not actively transmitting and receiving data). Roaming can require activating a transceiver in the mobile wireless device to search for alternative access points and processing any received signals. Adapting roaming properties to account for properties of a wireless network in which the mobile wireless device operates can improve both performance and power consumption to improve a user experience of the mobile wireless device.

A wireless local area network can be provided by a single access point such as in a home environment, by a few access points such as in a small office environment, or by numerous access points such as in a large enterprise office environment. Searching for and roaming to alternative access points can be adapted to the type of wireless local area network environment in which the mobile wireless device operates. Searching and roaming frequently in a home network in which no suitable alternative access points can exist can decrease data throughput and consume battery power unnecessarily. Searching and roaming infrequently in an enterprise network can result in suboptimal real time performance when signal strength can drop and switching between access points can be delayed. A single set of pre-determined roaming parameters for a variety of wireless local area network types can be less than ideal.

Thus there exists a need for methods and apparatuses to adapt roaming parameters for a mobile wireless device that can improve roaming in wireless networks.

SUMMARY OF THE DESCRIBED EMBODIMENTS

In one embodiment, a method of adapting roaming in a mobile wireless device in communication with a wireless network is described. The method includes at least the following steps. Detecting by the mobile wireless device a wireless network type for the wireless network to which the mobile wireless device is connected. Adjusting by the mobile wireless device one or more roaming parameters based on the detected wireless network type. The wireless network type is characterized by a service set identifier and a number of unique basic service set identifiers associated with the service set identifier per radio frequency band. In a representative embodiment, when the number of basic service set identifiers associated with the service set identifier is one per radio frequency band, the mobile wireless device adjusts the one or more roaming parameters to scan for and roam to alternative access points less frequently. When the number of basic service set identifiers associated with the service set identifier is more than one per radio frequency band, the mobile wireless device adjusts the one or more roaming parameters to scan for and roam to alternative access points more frequently.

In another embodiment, a method of roaming in a mobile wireless device is described. The method includes at least the following steps when the mobile wireless device is connected to a wireless network having a unique basic service set identifier associated with a service set identifier on a current radio frequency channel. The mobile wireless device scans for and roams to an alternative frequency channel in a higher radio frequency band when a receive signal strength for the current radio frequency channel is in a lower radio frequency band and exceeds a first predetermined threshold. The mobile wireless device further scans for and roams to an alternative radio frequency channel in a lower radio frequency band when the received signal strength for the current radio frequency channel is in a higher radio frequency band and falls below a second predetermined threshold. The first predetermined threshold exceeds the second predetermined threshold by a predetermined difference.

In a further embodiment, a method to adapt roaming parameters in a mobile wireless device is described. The method includes at least the following steps when the mobile wireless device is connected to a current access point. Retrieving from memory information for the current access point. Selecting one or more roaming parameters for the mobile wireless device based on the retrieved information for the current access point. Scanning for alternative access points. Receiving information from at least one alternative access point. Determining a wireless network type for the at least one alternative access points. Storing the received information and the determined wireless network type for the at least one located alternative access point. Updating the stored information for the current access point. Values for the determined wireless network type includes at least a single basic service set identifier per service set identifier type per radio frequency band and a multiple basic service set identifier per service set identifier type per radio frequency band.

In another embodiment, a mobile wireless device includes at least one transceiver, a configurable processor to control roaming of the mobile wireless device and a non-volatile memory to store access point information. The processor is configured to scan periodically for available access points. The processor is further configured to retrieve access point information from the non-volatile memory for one or more available access points. The processor is also configured to set roaming parameters for the mobile wireless device based on the retrieved access point information that includes a number of distinct basic service set identifiers associated with a service set identifier for each access point.

In a further embodiment, non-transitory computer program product encoded in a non-transitory computer readable medium for adapting roaming in a mobile wireless device is described. The non-transitory computer program product in the mobile wireless device includes at least the following non-transitory computer program code. Non-transitory computer program code for receiving information from alternative access points including at least a service set identifier and a basic service set identifier for each alternative access point. Non-transitory computer program code for maintaining a database of basic service set identifiers associated with service set identifiers for wireless networks to which the mobile wireless device is connected presently and has connected with previously. Non-transitory computer program code for retrieving information from the database to select an initial set of roaming parameters for the mobile wireless device. Non-transitory computer program code for updating the roaming parameters based on information received from alternative access points.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
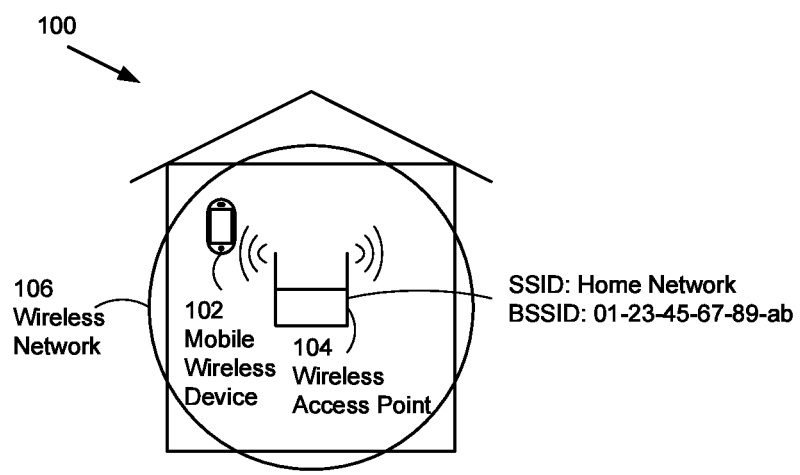
FIG. 1 illustrates a representative "home network" type of wireless local area network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for adapting roaming in a wireless mobile device, and in particular to improving roaming based on adapting roaming parameters based on measured and determined wireless network characteristics. It should be understood that implementations of the same methods and apparatuses described herein can apply to mobile wireless devices used in different types of wireless networks. In general, the teachings described herein can apply to a mobile wireless device operating in a wireless network based on radio access technology. The specific examples and implementations described herein are presented for simplicity in relation IEEE 802.11 wireless local area networks but also can apply to other wireless network environments.

Mobile wireless devices can offer advanced communication capabilities that can provide a variety of services across wireless networks that use different underlying wireless communication protocols and technologies. Users of the mobile wireless devices, such as "smart phones" that offer voice, data and video capabilities, can expect similar quality of service for comparable services no matter which wireless network on which the services operate. In particular, voice and "video chat" services can be provided through traditional circuit switched connections on cellular networks, through newer packet switched connections on cellular networks and through packet switched connections on wireless local area networks that in turn can connect through broadband wired or wireless links to telecommunication infrastructure networks. These services can require high performance quality of service characteristics to provide a desired user experience. The quality of connections between the mobile wireless device and access portions of wireless networks can vary based on multiple factors such as on signal attenuation and multi-path interference. As several different access points can be available to which the mobile wireless device can connect, shifting connections (or associations) between access points, i.e. roaming within or between wireless networks, can provide the mobile wireless device with a continuous connection having a high quality of service.

In wireless local area networks, the mobile wireless device can control roaming by disassociating from a current access point and by associating with an alternative access point. A set of alternative access points with which to associate can be determined by the mobile wireless device by searching for signals across a radio frequency band of radio frequency channels on which the alternative access points can transmit. To evaluate the availability and suitability of candidate access points, the mobile wireless device can tune an internal receiver to a radio frequency channel and listen for transmitted radio frequency beacon signals. As the radio frequency channel used by an alternative access point can differ from a current access point's radio frequency channel, the mobile wireless device can be precluded from transmitting and receiving data with the current access point when searching for candidate access points to which to roam. Roaming can thus affect data throughput. In addition, when the mobile wireless device is associated with a current access point and operating in a reduced power state, frequent roaming can increase power consumption unnecessarily, especially when few or no suitable alternative access points can exist. Adapting roaming parameters to characteristics of a wireless network in which the mobile wireless device operates can improve both throughput performance and battery power consumption. In dense wireless networks having many access points with significant overlapping radio frequency coverage, the mobile wireless device can roam more frequently to maintain a best possible connection. In sparse wireless networks with fewer access points, the mobile wireless device can roam less frequently to conserve battery power, as a connection with the current access point can often be the best connection possible.

The mobile wireless device can maintain a database of information for wireless networks of access points to which the mobile wireless device is currently connected and has been previously connected in order to determine a wireless network type. Based on a determined wireless network type, the mobile wireless device can adapt roaming parameters that can affect roaming behavior of the mobile wireless device. Information about access points can include unique hardware identifiers and associated wireless network names (which can be user entered for example and thus can be identical for different access points). In IEEE 802.11 wireless local area networks, each access point can have a unique hardware identifier known as a basic service set identifier (BSSID) and a text name known as a service set identifier (SSID). The BSSID can be a layer 2 MAC address, while the SSID can be a simple text label. By storing and retrieving associated sets of these identifiers, the mobile wireless device can determine a wireless network type and adapt roaming parameters appropriately.

These and other embodiments are discussed below with reference to FIGS. 1-14. However, those skilled in the art will readily appreciate that the detailed description given herein with respect to these figures is for explanatory purposes only and should not be construed as limiting.

FIG. 1 illustrates a representative "home" wireless local area network 100 that can include a wireless network 106 that provides an area of radio frequency coverage for signals transmitted by a single wireless access point 104. A mobile wireless device 102 can recognize the wireless access point 104 by listening for radio frequency beacon signals periodically broadcast by the wireless access point 104. The wireless access point can identify itself in the transmitted radio frequency beacons using both a text based wireless network name, such as an SSID illustrated with a representative value "Home Network", and by a unique hardware label, such as a BSSID illustrated by a representative value "01-23-45-67-89-ab". The mobile wireless device 102 can also search for the wireless access point 104 by transmitting a probe request on a radio frequency channel and listening for a probe response (or for the broadcast beacon) from the wireless access point 104. In a representative "home" wireless local area network 100 as illustrated in FIG. 1, the single wireless access point 104 can provide radio frequency coverage for the entire home. The mobile wireless device 102 can associate with (or connect to) the wireless network 106 emanating from the wireless access point 104. Roaming to an alternative access point can be not required until the mobile wireless device leaves the coverage area of the wireless access point 104. Thus roaming in a "home" wireless local area network can be executed relatively infrequently. Battery power consumption for roaming by the mobile wireless device 102 can thus be reduced, as a stable connection to the wireless access point 104 can generally be maintained.

The mobile wireless device 102 can maintain a database of wireless networks to which it has previously connected and can identify a wireless network type based on the number of unique BSSIDs associated with an SSID per radio frequency band in the database. An SSID with only one BSSID per radio frequency band can be considered a "sparse" wireless local area network. When associated with or connected to such as sparse wireless network, the mobile wireless device 102 can use a set of roaming parameters that can influence roaming behavior to roam less frequently than when using a default set of roaming parameters. Representative roaming parameters can include signal quality thresholds below which the mobile wireless device can search for candidate access points and signal quality difference thresholds that can determine when a candidate alternative access point has sufficient signal quality to warrant switching. A default set of roaming parameters can be used when the mobile wireless device 102 associates with an unknown wireless network, and an active set of roaming parameters can be adapted as the mobile wireless device learns more about the wireless network environment. The roaming parameters can also be adapted based on information gathered during a history of searching for and/or roaming to different access points.

Figure 2:
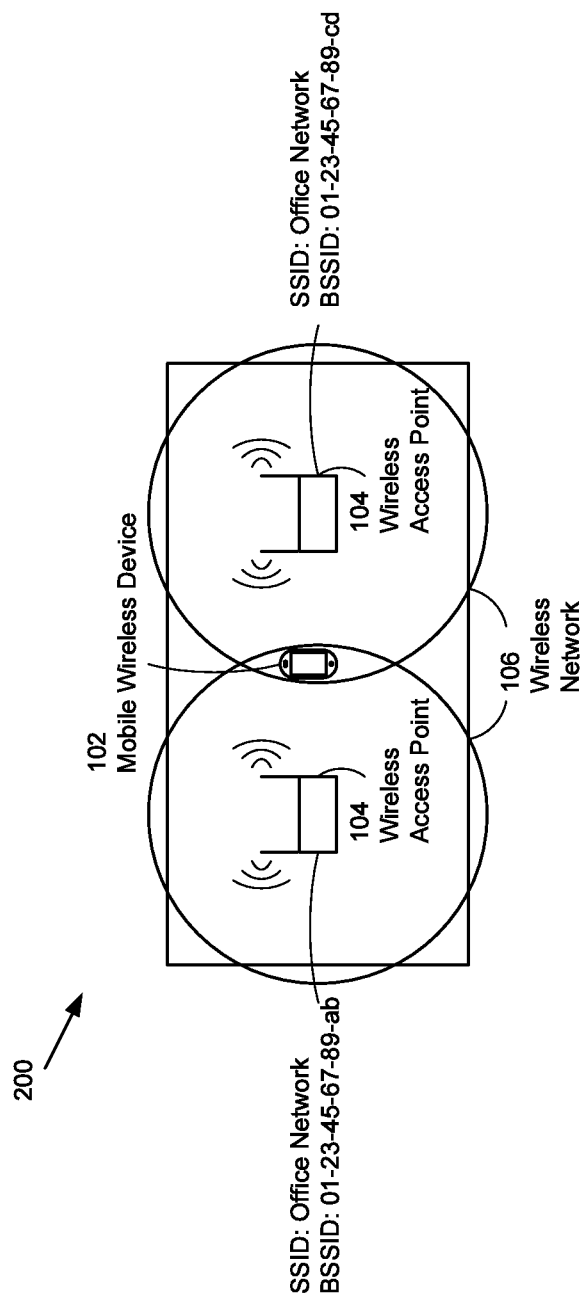
FIG. 2 illustrates a representative "small office network" type of wireless local area network.

FIG. 2 illustrates a representative "small office" wireless network 200 with two wireless access points 102 that overlap to create a common wireless network 106. Each of the wireless access points 102 can have the same SSID, e.g. "Office Network", and can also have separate BSSID values as indicated in FIG. 2. When associated with or connecting to the "small office" wireless network 200, the mobile wireless device 102 can recognize that more than one wireless access point 102, each having a unique BSSID per radio frequency band, shares the same SSID and can adapt roaming parameters appropriately. In a representative embodiment, the mobile wireless device 102 can adapt the roaming parameters in a manner similar to that used for the "home" network 100 of FIG. 1. In another representative embodiment, the mobile wireless device 102 can adapt the roaming parameters to result in a more frequent searching and/or roaming in the "small office" network 200 than in the "home" network 100. With the "small office" network 200, the mobile wireless device 102 can roam between each of the wireless access points 104 in the wireless network 106. FIG. 2 can also represent a "home" network in which two different wireless access points 104 can be used to create a wider wireless network than a single access point 104 alone. Roaming between the two different wireless access points 104 can be desired, but searching for alternative access points can be less desirable. Thus, the roaming parameters can be selected to ensure less frequent searching but ready switching between access points in the "small office" network 200.

Figure 3:
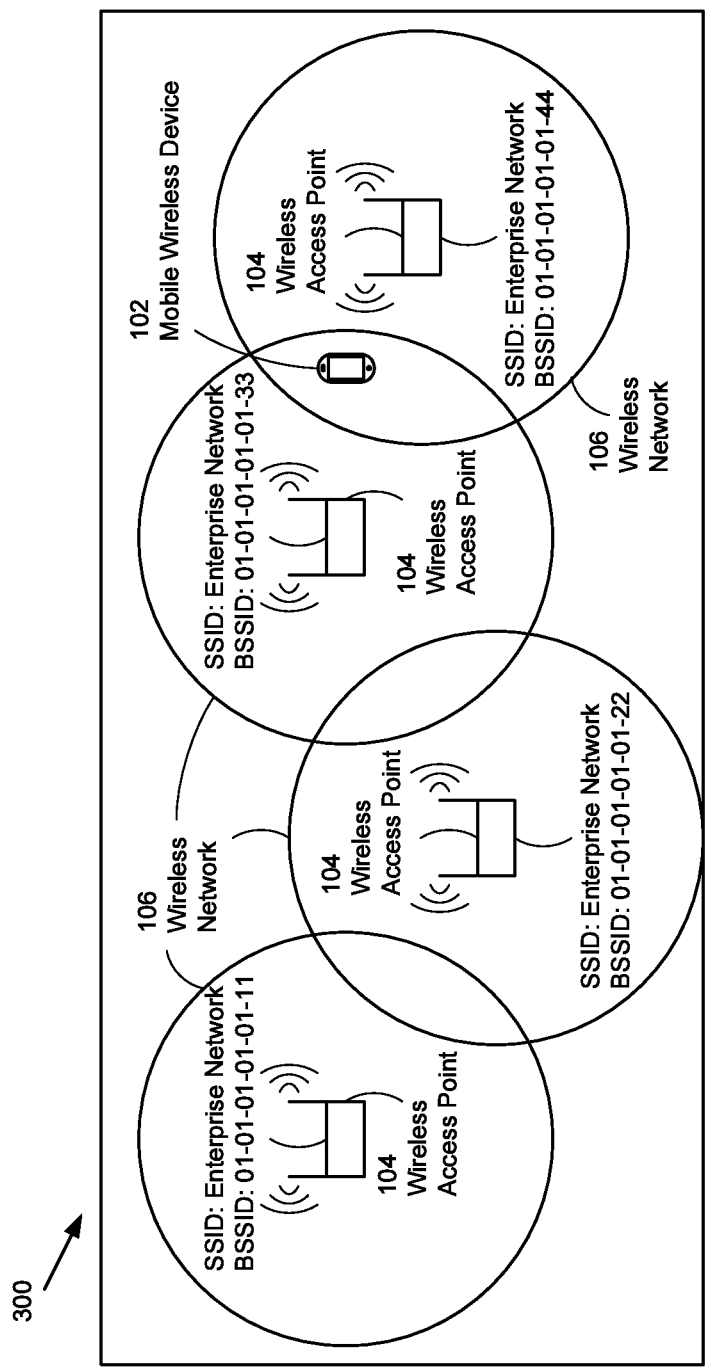
FIG. 3 illustrates a representative "enterprise office network" type of wireless local area network.

FIG. 3 illustrates a representative "enterprise" wireless network 300 that can include more than two different wireless access points 104. Each of the wireless access points 104 in the "enterprise" wireless network 300 can use the same SSID value and can also use unique BSSID values. The mobile wireless device 102 can adapt roaming parameters when associated with or connected to one of the access points 104 in the "enterprise" wireless network 300 to cause more frequent searching for and roaming among access points 104. A relatively "dense" network of access points 104 can offer a higher level of signal quality (which can directly impact data throughput performance) than a "sparse" and widely separated network of access points 104. By switching connections more frequently between the wireless access points 104 in the "enterprise" network 300, the mobile wireless device 102 can maintain a higher performance level than when waiting longer to search for and roam among alternative access points 104.

In addition to the number of unique BSSID values associated with an SSID value per radio frequency band, the mobile wireless device 102 can consider additional characteristics for the access points 104 when determining a wireless network type. The access point 104 can be configured to a particular security setting (such as a type of encryption). Two different access points 104 that have the same SSID but different security settings can be considered to belong to two distinct wireless networks and not to a common wireless network, as one can expect a common wireless network to use a common security setting. The mobile wireless device 102 can also consider radio frequency bands used by the access points 104 to determine whether two access points 104 form a common wireless network. A multiple frequency band access point 104 can have more than one transceiver that can each operate in a different radio frequency band, e.g. a 2.4 GHz transceiver and a 5.0 GHz transceiver. Each of the transceivers can have a different BSSID and a common SSID. Such a multiple frequency band access point 104 can still be considered a "single" access point 104 rather than a "multiple" access point 104 when setting and/or adapting roaming parameters.

Figure 4:
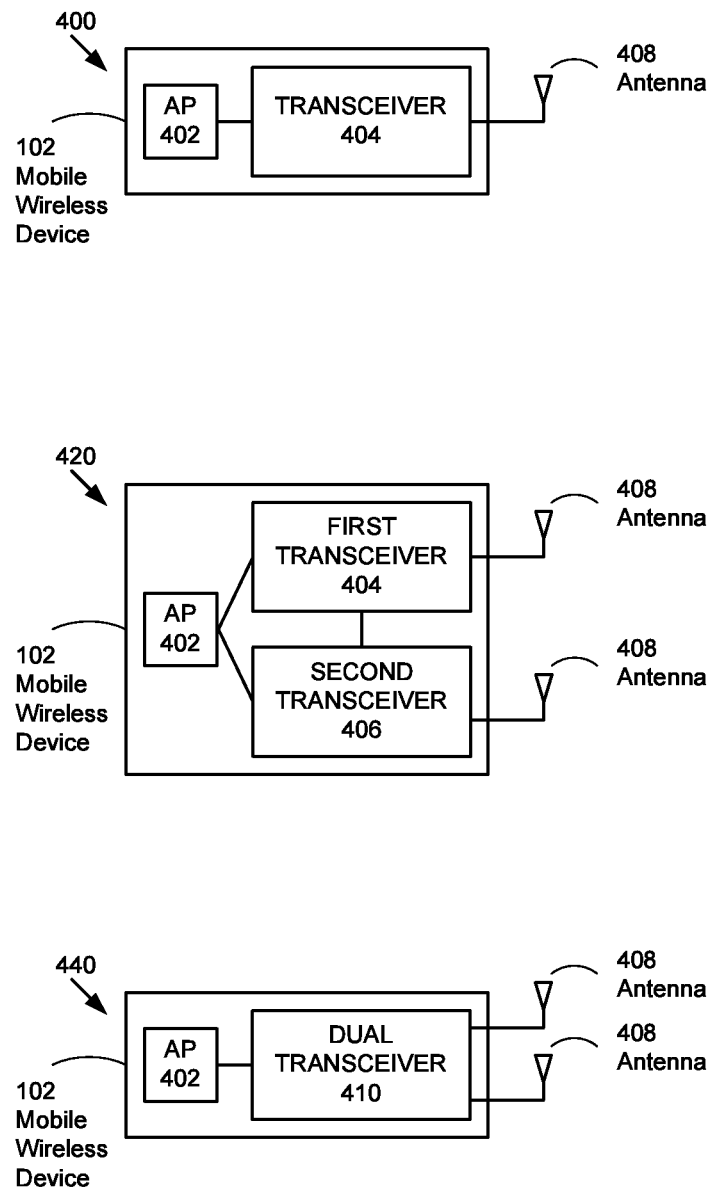
FIG. 4 illustrates several representative architectures for a mobile wireless communication device.

FIG. 4 illustrates several representative architectures for select components in the mobile wireless device 102. In the first architecture 400, the mobile wireless device 102 can include a single transceiver 404 connected to an antenna 408 and to a configurable application processor (AP) 402. The application processor can control establishing and tearing down connections between the mobile wireless device 102 and an access point 104 in a wireless network. The transceiver 404 can convert digital data into analog signals that can be transmitted and received through the antenna 408 on a radio frequency channel in a radio frequency band. The transceiver 404 can be tunable to different radio frequency channels in one or more radio frequency bands and can thus connect the mobile wireless device 102 to different access points 104 that can use different radio frequency channels. When searching for one or more access points 104 with which to associate and/or connect, the mobile wireless device 102 can tune the transceiver 404 to a radio frequency channel and can listen for broadcast beacon signals transmitted by an access point 104. The mobile wireless device 102 can also transmit on the radio frequency channel a probe request and listen for a probe response from an access point 104. The probe request can include a broadcast SSID, while the beacon signals and probe responses can include specific SSIDs. The mobile wireless device 102 can re-tune the transceiver 404 to a number of different radio channel frequencies each time when searching for access points 104. The radio channel frequencies searched can be in the same radio frequency band used currently by the mobile wireless device 102 or can be located in a different radio frequency band, particularly for "multi-band" mobile wireless devices 102. With a single transceiver 404, the mobile wireless device 102 having the architecture 400 can transmit and receive on only one radio frequency channel at a time, and thus roaming can interrupt communication on a currently used radio frequency channel with a current access point in order to search for alternative access points that can use different radio frequency channels.

In a second architecture 420, the mobile wireless device 102 can include a first transceiver 404 and a second transceiver 406 connected to the application processor 402. Each of the transceivers 404/406 can be connected to a distinct antenna 408 and can also be connected to each other to communicate control information between them. When a wireless communication protocol uses multiple input multiple output (MIMO) transmission, such as in an IEEE 802.11n wireless network, both transceivers 404/406 can be used for connecting to an access point 104 in a wireless network 100. When only one of the transceivers 404/406 can be required for transmission, the mobile wireless device 102 can use one of the transceivers, for example the first transceiver 404, for active communication with the access point 104 and the second transceiver 406 for background communication, such as for searching for alternative access points 104.

In a third architecture 440, a dual transceiver 410 can provide capabilities similar to those provided by the second architecture 420. The methods and apparatuses described herein can apply equally to a wide variety of architectures for the mobile wireless device 102, including single transceiver, multiple transceiver and other architectures that integrate various functions within the mobile wireless device 102 into common components. Without loss of generality, the mobile wireless device 102 can include separately one or more transceivers 404/406/410 and an application processor 402; however, other architectures can provide integrate functions provided by the one or more transceivers 404/406/410 and the application processor 402 together.

Figure 5:
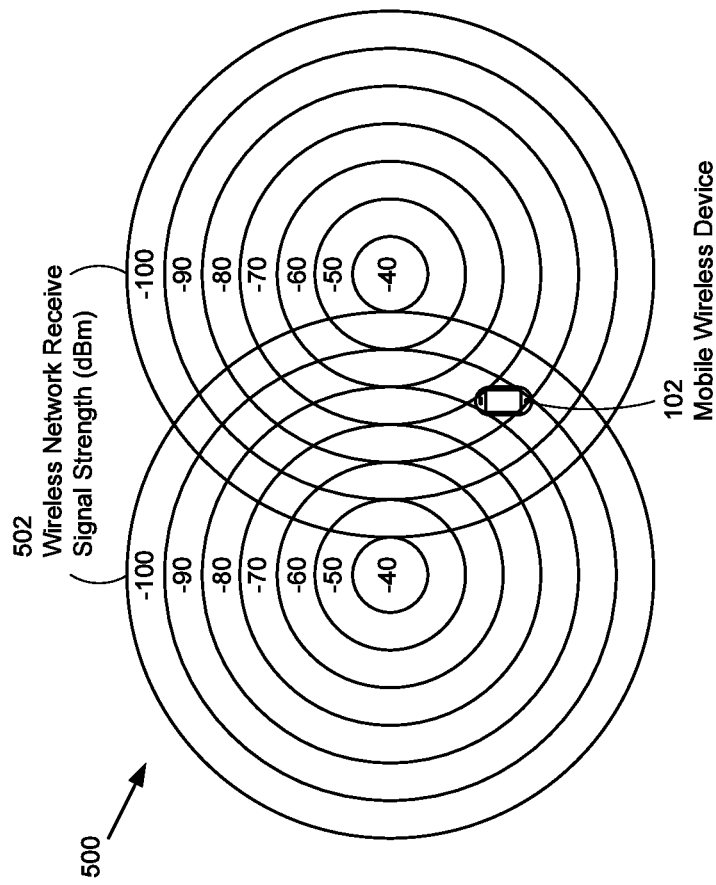
FIG. 5 illustrates a representative map of receive signal strength for two overlapping wireless network access points.

FIG. 5 illustrates a wireless network 500 of two access points 104 (not shown explicitly) with representative wireless network receive signal strength 502 values received by the mobile wireless device 102 based on a distance from the access point 104. For simple representational purposes, the wireless network receive signal strength 502 shown can decrease linearly with increasing distance from the access point 102; however, the actual receive signal strength 502 can have a different profile than that shown in FIG. 5. For example, receive signal strength 502 can decrease more rapidly and can have a variable contour profile. No loss of generality for receive signal strength 502 is intended by the representative diagram shown. The mobile wireless device 102 can be connected to one of the access points 104, for example with a receive signal strength of −90 dBm and can measure a receive signal strength of −80 dBm for the position of the mobile wireless device 102 indicated in FIG. 5. As the mobile wireless device 102 changes location, the receive signal strength 502 can vary, and the mobile wireless device 102 can compare the receive signal strength 502 of the current access point 104 with receive signal strengths 502 from alternative access points 104.

Searching for alternative access points 104, listening for receive signals, and measuring receive signal strengths can be triggered by comparing the receive signal strength 502 for the current access point 104 to a first threshold. Roaming to an alternative access point 104 can be effected when the mobile wireless device 102 measures a receive signal strength difference between the alternative access point 104 and the current access point 104 that exceeds a second threshold. The first and second thresholds can be included in a set of roaming parameters that the mobile wireless device 102 can use to determine when to roam. Periodic searching can be referred to as "scanning" and the first threshold can be considered a "scan threshold" that can initiate searching for alternative access points. The second threshold can be referred to as a "roam threshold" that can determine when the difference in receive signal strength at the mobile wireless device 102 can warrant switching from the current access point 104 to the alternative access point 104.

Figure 6:
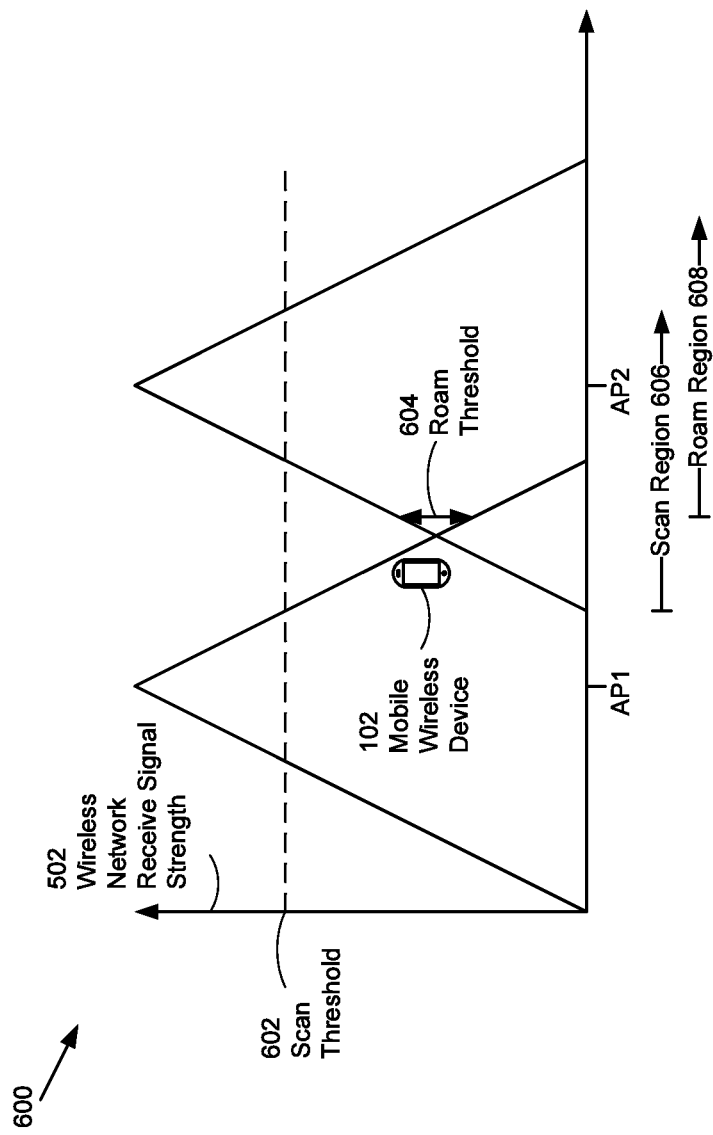
FIGS. 6, 7, 8 and 9 illustrate several roaming parameters relative to a receive signal strength that impact roaming for a mobile wireless device in a wireless network of multiple access points.

FIG. 6 illustrates a graph 600 of the receive signal strength 502 for a wireless network of two access points 104 (AP1 and AP2) along a line directly connecting the two access points 104. The receive signal strength 502 can be strongest centered on each access point 104 and can decrease linearly as the distance increases away from the access point 104. (Receive signal strength can decrease non-linearly and more rapidly than shown herein, but a linear decrease can be used without loss of generality for simplicity of representation.) The mobile wireless device 102 can be connected to one of the access points 104, for example AP1. The mobile wireless device 102 can initiate a scan for alternative access points 104 when the receive signal strength 502 from access point 104 AP1 falls below a scan threshold 602. A scan region 606 can be defined over which the mobile wireless device 102 can search for alternative access points 104 based on comparing the receive signal strength 502 at the mobile wireless device 102 to the scan threshold 602. Changing the scan threshold can affect the scan region 606. A roam threshold 604 can determine a difference in receive signal strength 502 between the alternative access point 104 and the current access point 104 that can allow the mobile wireless device 102 to disassociate with the current access point 104 and associate with the alternative access point 104. As shown in FIG. 6, the roam threshold 604 can determine a roam region 608 that differs from the scan region 606. The scan threshold 602 and/or the roam threshold 604 can be adjusted to cause the mobile wireless device 102 to search for and roam to alternative access points 104 more frequently or less frequently. A higher scan threshold 602 and a lower roam threshold 604 can result in more frequent searching and roaming, while a lower scan threshold 602 and a higher roam threshold can result in less frequent searching and roaming between the current access point 104 and alternative access points 104.

Figure 7:
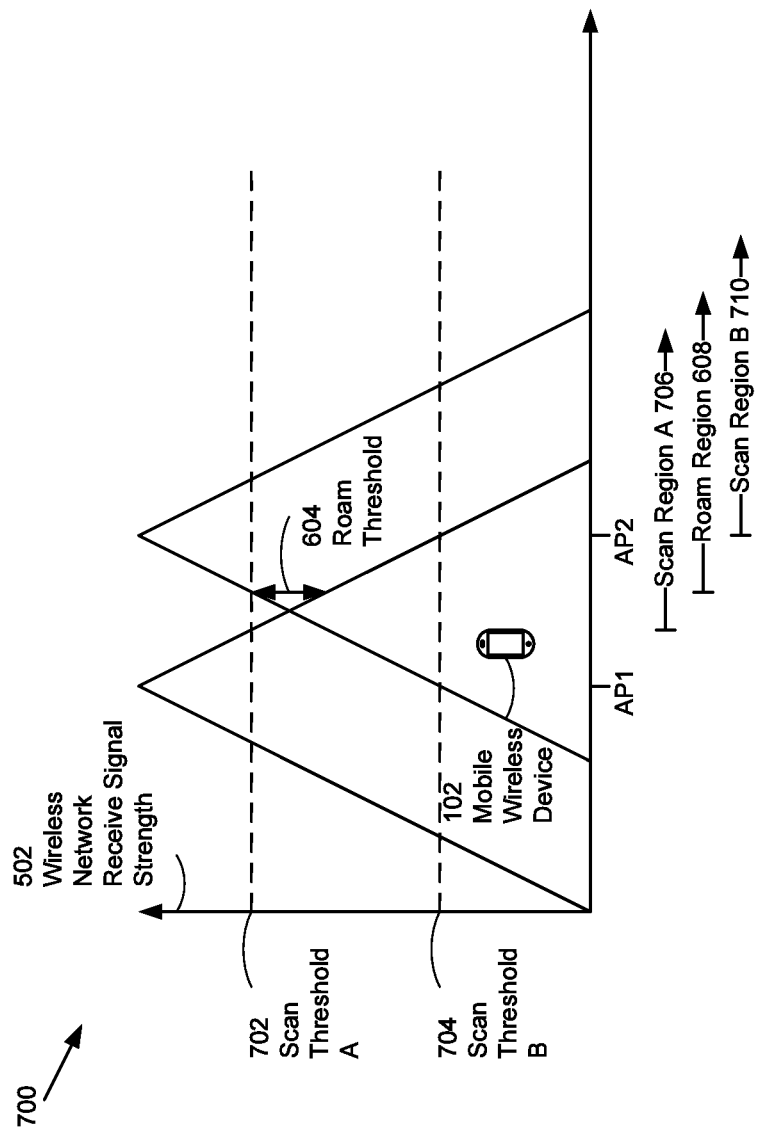

FIG. 7 illustrates a graph 700 of the receive signal strength 502 for a wireless network of two access points 104 (AP1 and AP2) with two different scan thresholds 702/704. When the mobile wireless device 102 is connected to the access point 104 AP1, the scan threshold A 702 can determine a scan region A 706, while the scan threshold B 704 can determine a smaller scan region B 710. The scan region B 710 can be smaller than the scan region A 706, because the receive signal strength 502 measured at the mobile wireless device 102 must be lower when using scan threshold B 704 in order for the mobile wireless device 102 to initiate searching for alternative access points 104. In fact, as shown in FIG. 7, the scan region 706/710 can be larger or smaller than the roam region 608 depending on the values for the scan threshold 702/704 and for the roam threshold 604. In general, raising the scan threshold 702/704 to a higher value can result in the mobile wireless device 102 searching for alternative access points 104 more frequently, while lowering the scan threshold 702/704 to a lower value can cause the mobile wireless device 102 to search for alternative access points 104 less frequently. A too "conservative" scan threshold value can result in the mobile wireless device 102 searching for alternative access points 104 later than when roaming to the alternative access points 104 can be achieved, thus affecting performance of the mobile wireless device 102. On the other hand, an "aggressive" scan threshold value can result in the mobile wireless device 102 searching for alternative access points 104 earlier when fewer (if any) alternative access points 104 can satisfy the roam threshold 604, which can unnecessarily lower data throughput or drain battery power. The scan threshold and roam threshold values can be adaptively adjusted depending on specifics of the wireless network in which the mobile wireless device 102 can be operating.

Figure 8:
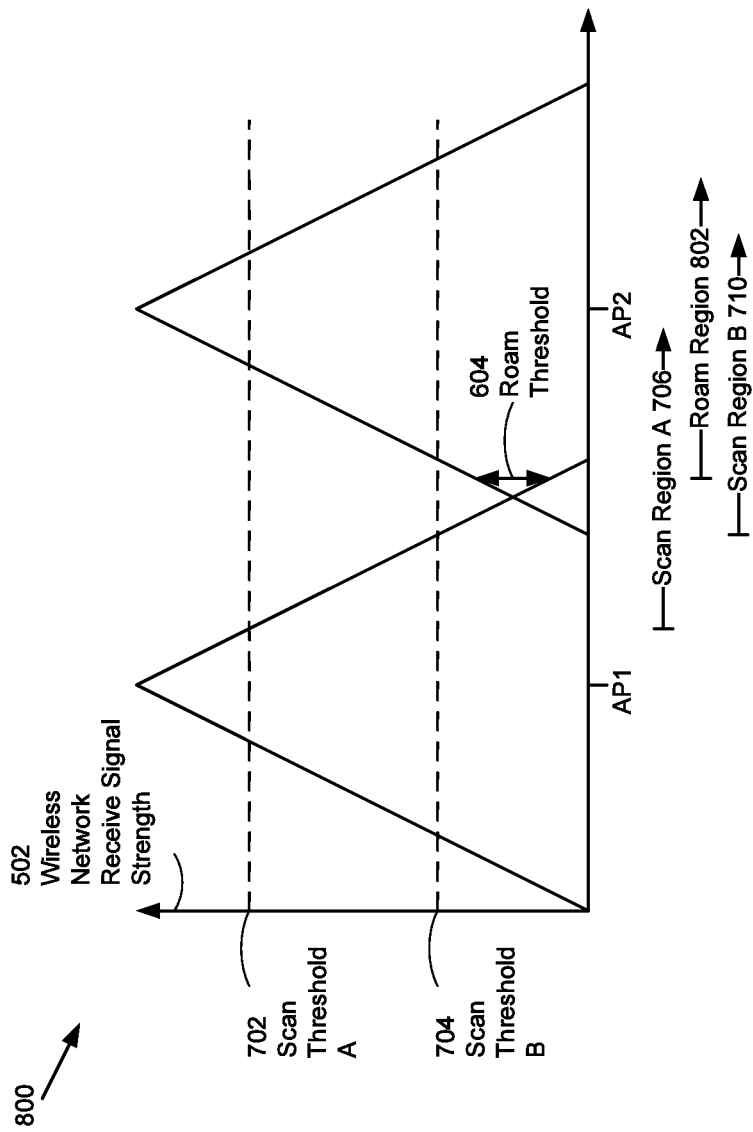

FIG. 8 illustrates a graph 800 of wireless network receive signal strength 502 for a mobile wireless device 102 using the same values for the scan thresholds 702/704 and the roam threshold 604 shown in FIG. 7; however, the access points 104 AP1 and AP2 in FIG. 8 are separated by a greater distance from each other than the access points 104 AP1 and AP2 in FIG. 7. In FIG. 7, the roam region 608 fell in between the more aggressive scan region A 706 and the more conservative scan region B 710. By separating the access point 102 AP2 further from the access point 102 AP1, as illustrated in FIG. 8, the roam region 802 can move with the access point AP2 (further to the right). Both scan regions A and B 706/710 can be wider than (to the left of) the roam region 802. Both scan threshold A 702 and scan threshold B 704 can be considered "aggressive" values, as the mobile wireless device 102 can scan for alternative access points 104 before roaming is possible (as determined by the roam threshold 604). In FIG. 7, the scan threshold B 704 can be considered a "conservative" value, as roaming can be possible before searching for alternative access points 104 can occur. Comparing scan region A 706 with scan region B 710 relative to roam region 802 in FIG. 8, the higher scan threshold A 702 can provide little (if any) benefits in a more widely spaced (i.e. sparser) wireless network. In general, for a densely placed network of multiple access points 104, a higher scan threshold can prove desirable, while in a sparsely populated network of fewer access points 104, a lower scan threshold can be desired. The scan threshold value for a particular wireless network of access points can be adapted based on the number and density of access points 104 in the particular wireless network to achieve a desired roaming behavior.

Figure 9:
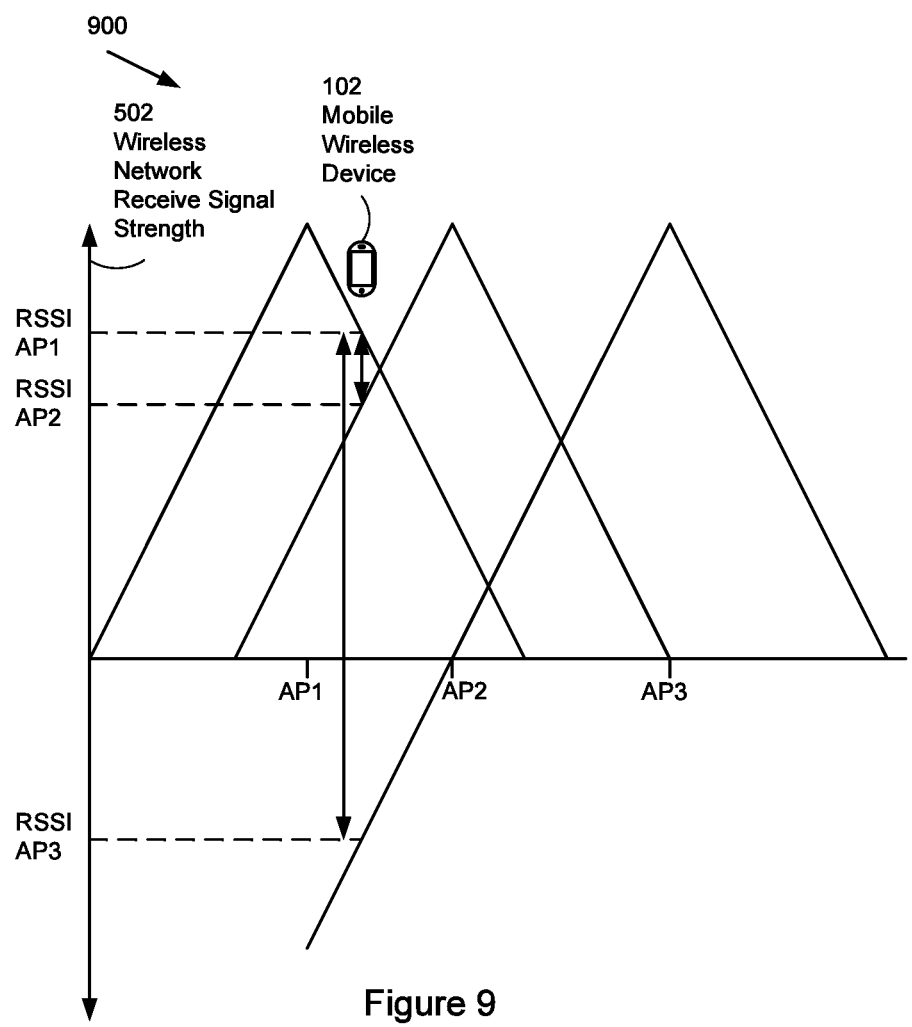

FIG. 9 illustrates a graph 900 of another cross section of receive signal strength 502 for a wireless network of access points 104. The mobile wireless device 102 can use measured values of receive signal strength 502 from multiple access points 104 in the wireless network to estimate the wireless network's density characteristics. FIG. 9 shows receive signal strength 502 for three different access points 104 AP1, AP2 and AP3. For a wireless network that can include access points 104 AP1 and AP2 (excluding AP3), the mobile wireless device 102 can measure receive signal strength 502 levels as indicated by RSSI AP1 and RSSI AP2. The difference between receive signal strengths 502 for AP1 and AP2 can be relatively low, and the difference in RSSI can indicate a "dense" wireless network of access points 104. For a different wireless network that can include access points 104 AP1 and AP3 (excluding AP2), the two access points 104 being spaced further apart than access points 104 AP1 and AP2, the measured difference between receive signal strengths can be relatively high as indicated by the difference between RSSI AP1 and RSSI AP3. The relatively high difference in receive signal strength 502 can indicate a "sparse" wireless network of access points 104. There can be multiple access points 104 in a wireless network, and the difference in receive signal strength 502 between pairs of access points 104 can be calculated based on various combinations of access points 104. In a representative embodiment, the difference in receive signal strength 502 for the wireless network can be calculated between the current access point 104 and the alternative access point 104 with the highest valued receive signal strength 502. In another representative embodiment, the difference in receive signal strength 502 can be calculated between the two alternative access points 104 with the highest valued receive signal strengths 502. A difference in received signal strength 502 can also be calculated among all pairs of access points 104, including the current access point 104 and all alternative access points 104 to determine a difference function. A mean and variance of the difference function can be also used to evaluate the "density" of access points 104 in the wireless network and to determine whether the mobile wireless device 102 is operating in a "sparse" wireless network or in a "dense" wireless network.

The mobile wireless device 102 can determine a wireless network type, such as a "home", "small office" or "enterprise" wireless network type. Similarly, the mobile wireless device 102 can determine a wireless network characteristic, such as a "sparse" or "dense" wireless network. The mobile wireless device 102 can use the determined type/characteristic to adapt roaming parameters rather than use a single fixed set of roaming parameters in different wireless networks. Roaming parameters that can be varied can include a "scan" threshold and a "roam" threshold. Additional roaming parameters can include a frequency of roaming, a time interval between successive searches when roaming, a number of access points searched during each roaming search, a time for each search for alternative access points, a time delay for a search when data traffic occurs and a state of the mobile wireless device (e.g., idle or active). The roaming parameters can be adapted to achieve rapid responsive searches for alternative access points to provide a high performance level or for less frequent searching to conserve battery power. The roaming parameters can also be adapted to minimize data throughput interruption. The roaming parameters used can differ based on the radio frequency band used. In general, the mobile wireless device 102 can adapt the roaming parameters to search for and roam to alternative access points 104 less frequently for a wireless network with a single access point 104, a "sparse" wireless network or a "home" wireless network and to search for and roam to alternative access points 104 more frequently in a multiple access point 104 wireless network, a "dense" wireless network or a "enterprise" wireless network.

In an embodiment the mobile wireless device 102 can adapt roaming parameters based on a history of past roaming. The mobile wireless device 102 can determine a roaming success rate based on how frequently an alternative access point 104 suitable for roaming is located for a search. A low roaming success rate (e.g. <50%) and/or a history of repeated failed searches can indicate that the roaming thresholds can be set to search for alternative access points 104 too often or that the threshold to switch to the alternative access points 104 can be too high. Alternatively, a very high roaming success rate (e.g. >95%) and/or a history of repeated successful searches can indicate that the roaming thresholds are set to search for alternative access points 104 too infrequently or that the threshold to switch to an alternative access point 104 is too low. In a representative embodiment, the mobile wireless device 102 can adapt roaming parameters to achieve a roaming success rate between approximately 75 percent and 95 percent. The mobile wireless device 102 can also monitor the difference in received signal strength 502 when successfully roaming between a "new" access point 104 and an "old" access point 104. When the difference in receive signal strength 502 is too high, the roaming parameters can be set too conservatively, while when the difference in receive signal strength 502 is too low, the roaming parameters can be set too aggressively. In a representative embodiment, the mobile wireless device 102 can adapt roaming parameters to achieve a measured difference in receive signal strength less than 20 dB.

The mobile wireless device 102 can be configured to include one or more default sets of roaming parameters, e.g. a set of roaming parameters for a single access point 104 wireless network, and a set of roaming parameters for a "multiple" access point 104 wireless network. The choice of which set of roaming parameters to use can be automatically determined by the mobile wireless device 102 based on an estimate of the wireless network type for the wireless network to which the mobile wireless device 102 is currently connected or to which the mobile wireless device 102 can switch to be connected. A user of the mobile wireless device 102 can provide through a user interface an indication of the wireless network type, which can be saved in memory for an identifier for the wireless network (e.g. with the SSID). Each set of default roaming parameters can be chosen to achieve a set of roaming behavior characteristics, such as frequency of searching for and ease of switching to alternative access points 104, for the particular wireless network type. The mobile wireless device 102 can also maintain a database of wireless networks, e.g. organized by SSID and associated BSSID(s), and can adapt roaming parameters for each particular wireless network maintained in the database. A profile for each wireless network can be maintained. When connecting to a previously identified wireless network, the mobile wireless device 102 can retrieve a profile for the wireless network and can select a set of roaming parameters from the stored database. The roaming parameters for the wireless network can continue to be adapted by the mobile wireless device 102 to maintain a desired level of roaming characteristics and can be stored in memory for future use. Properties of the wireless network can be estimated by the mobile wireless device 102 based on information received from access points in the wireless network.

Figure 10:
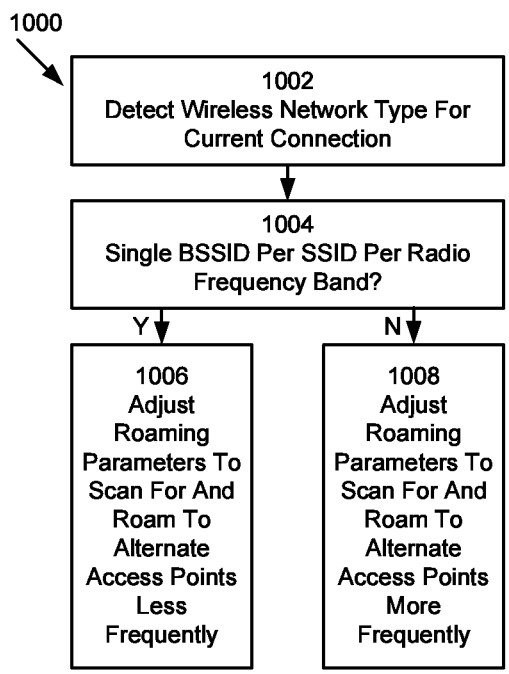
FIGS. 10, 11, 12, 13 and 14 illustrate representative methods to adapt roaming for a mobile wireless device.

FIG. 10 illustrates a representative method 1000 to adapt roaming parameters in a mobile wireless device 102. In step 1002, the mobile wireless device 102 detects a wireless network type for a current connection (or association) to an access point 104. In step 1004, the mobile wireless device determines if the SSID of the access point 104 is associated with a single BSSID per radio frequency band. When the SSID is associated with a unique single BSSID per radio frequency band, the mobile wireless device 102 in step 1006 adjusts roaming parameters to scan for and roam to alternative access point 104 less frequently. When the SSID is associated with more than one BSSID per radio frequency band, the mobile wireless device 102 in step 1008 adjusts the roaming parameters to scan for and roam to alternative access points more frequently. The wireless network type is characterized by a service set identifier and a number of unique basic set service identifiers associated with the service set identifier.

Figure 11:
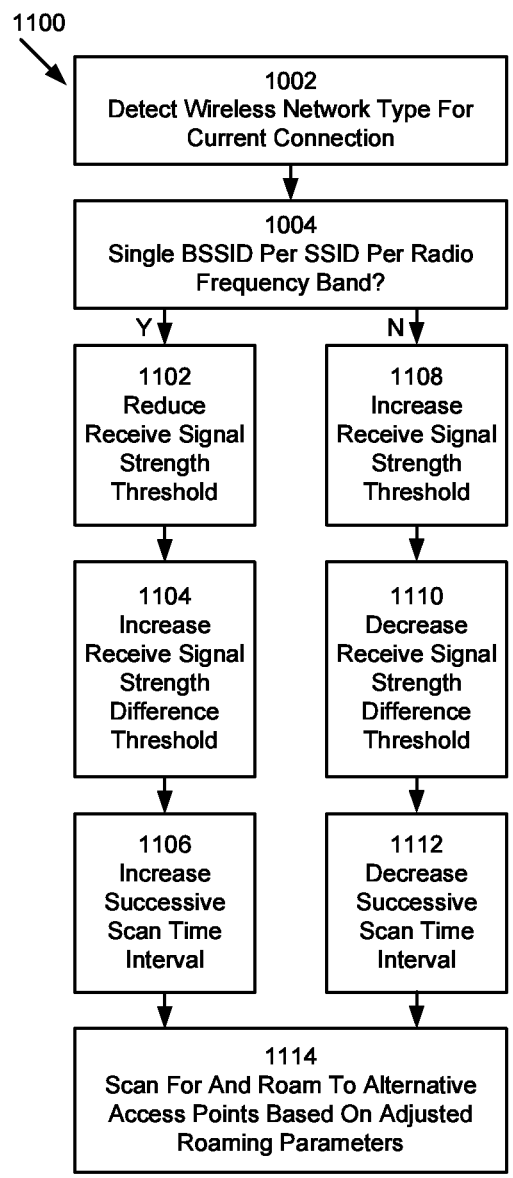

FIG. 11 illustrates another representative method 1100 to adapt roaming parameters in a mobile wireless device 102. In step 1002, the mobile wireless device 102 detects a wireless network type for a current connection (or association) to an access point 104. In step 1004, the mobile wireless device determines if the SSID of the access point 104 is associated with a single BSSID per radio frequency band. When the SSID is associated with a unique single BSSID per radio frequency band, the mobile wireless device 102, the mobile wireless device executes one or more of steps 1102, 1104 and 1106. In step 1102, the mobile wireless device 102 reduces a receive signal strength threshold 502. The receive signal strength threshold 502 is used to determine at what level of receive signal strength below which the mobile wireless device 102 searches for alternative access points 104. In step 1104, the mobile wireless device 102 increases a receive signal strength difference threshold. The receive signal strength difference threshold is used to determine how much higher in receive signal strength an alternative access point 104 must be to warrant switching a connection. In step 1106, the mobile wireless device 102 increases a scan time interval for successive searches for alternative access points 104. One or more of the steps 1102, 1104 and 1106 are used to cause the mobile wireless device 102 to scan for and roam to alternative access points 104 less frequently in step 1114 based on the adjusted roaming parameters.

When the SSID is not associated with a unique single BSSID per radio frequency band, the mobile wireless device 102 executes one or more of steps 1108, 1110 and 1112. In step 1108, the mobile wireless device 102 increases the receive signal strength threshold 502. The mobile wireless device 102 also decreases a receive signal strength difference threshold in step 1110. In step 1112, the mobile wireless device 102 decreases a scan time interval for successive searches for alternative access points 104. One or more of the steps 1108, 1110 and 1112 are used to cause the mobile wireless device 102 to scan for and roam to alternative access points 104 more frequently in step 1114 based on the adjusted roaming parameters.

Figure 12:
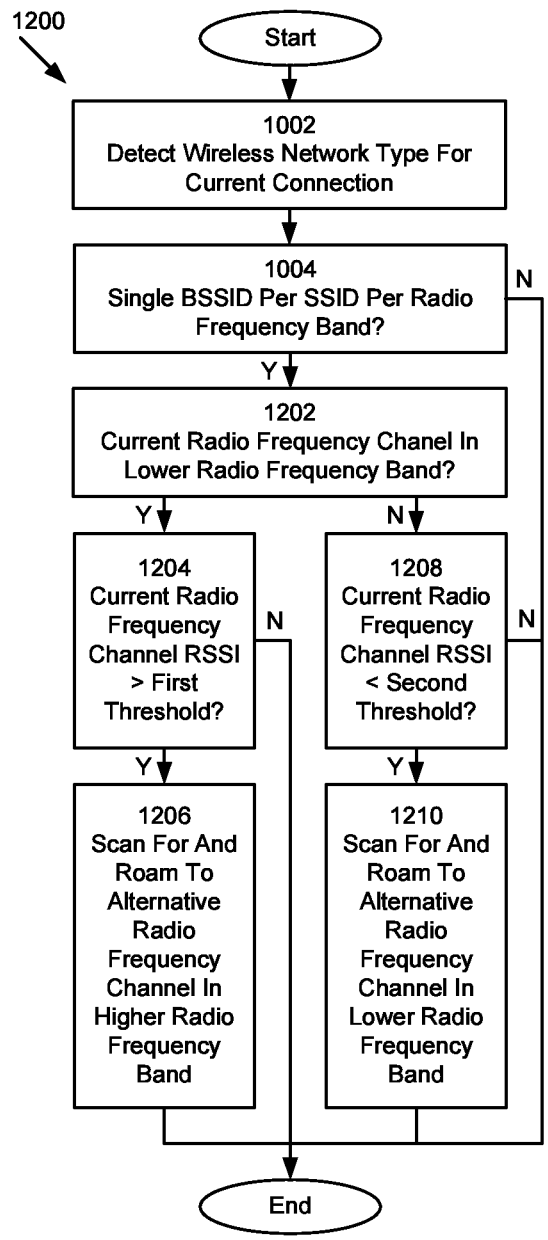

FIG. 12 illustrates yet another representative method 1200 to adapt roaming parameters in a mobile wireless device 102. In step 1002, the mobile wireless device 102 determines a wireless network type for a current connection. In step 1004, the mobile wireless device 102 tests whether an SSID for an access point 104 to which the mobile wireless device 102 is currently connected has a single unique BSSID per radio frequency band. When the SSID is associated with a unique single BSSID per radio frequency band, in step 1202, the mobile wireless device 102 detects whether the current radio frequency channel in use is in a lower radio frequency band. When the current radio frequency channel is in a lower radio frequency band, the mobile wireless device 102, in step 1204, determines if the receive signal strength for the current radio frequency channel exceeds a first pre-determined threshold. When the current radio frequency channel RSSI exceeds the first pre-determined threshold, the mobile wireless device 102, in step 1206, scans for and roams to an alternative radio frequency channel in a higher radio frequency band. When the current radio frequency channel is not in a lower radio frequency band (i.e. in a higher radio frequency band), the mobile wireless device 102, in step 1208, determines if the receive signal strength for the current radio frequency channel falls below a second pre-determined threshold. When the current radio frequency channel RSSI falls below the second pre-determined threshold, the mobile wireless device 102, in step 1210, scans for and roams to an alternative radio frequency channel in a lower radio frequency band.

The method 1200 outlined in FIG. 12 can cause the mobile wireless device 102 to use a higher radio frequency band when situated more closely to a dual radio frequency band access point 104 and a lower radio frequency band when positioned further away from the access point 104. Transmission at lower radio channel frequencies can provide broader coverage albeit with lower throughput rates than transmission at higher radio channel frequencies that can provide higher throughput rates with narrower area coverage. In a representative embodiment, a difference between the first predetermined threshold and the second predetermined threshold is greater than 10 dB. In a representative embodiment, the lower radio frequency band is a 2.4 GHz radio frequency band, and the higher radio frequency band is a 5.0 GHz radio frequency band.

Figure 13:
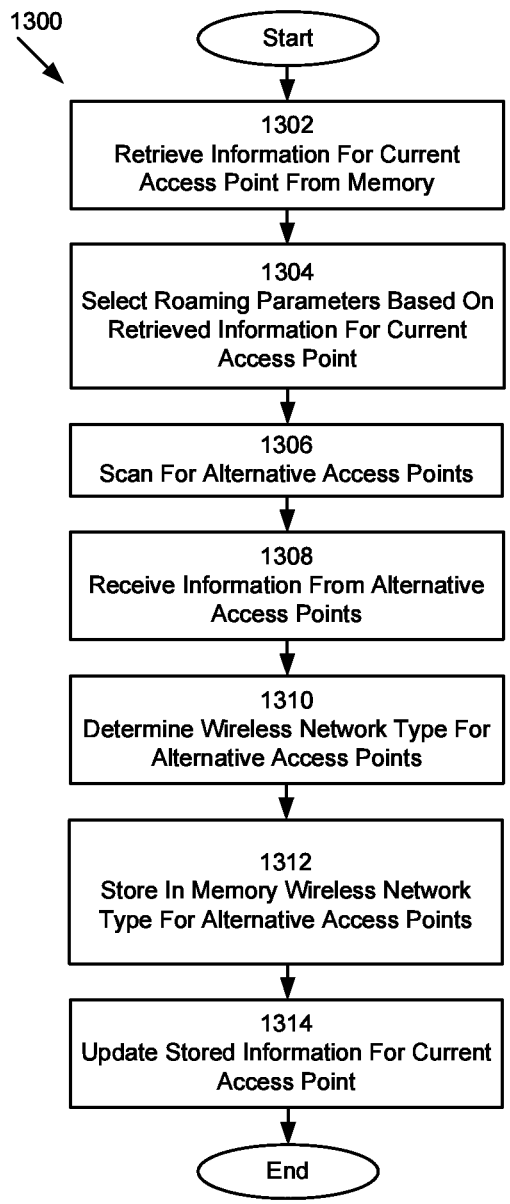

FIG. 13 illustrates another method 1300 to adapt roaming parameters for a mobile wireless device 102. In step 1302, the mobile wireless device 102 retrieves information from memory for a current access point 104 to which the mobile wireless device 102 is connected. In step 1304, the mobile wireless device 102 selects one or more roaming parameters for the mobile wireless device 102 based on the retrieved information for the current access point 104. In step 1306, the mobile wireless device 102 scans for alternative access points 104. In step 1308, the mobile wireless device 102 receives information from one or more alternative access points 104. In step 1310, the mobile wireless device 102 determines a wireless network type for the alternative access points 104. In step 1312, the mobile wireless device 102 stores in memory the received information and the determined wireless network type for the alternative access points 104. In step 1314, the mobile wireless device 102 updates the stored information for the current access point 104. In a representative embodiment, the wireless network type includes at least a "single BSSID per SSID per radio frequency band" type and a "multiple BSSID per SSID per radio frequency band" type. In a representative embodiment, the "multiple BSSID per SSID per radio frequency band" type further includes a "two BSSID per SSID per radio frequency band" type and a "more than two BSSID per SSID per radio frequency band" type.

Figure 14:
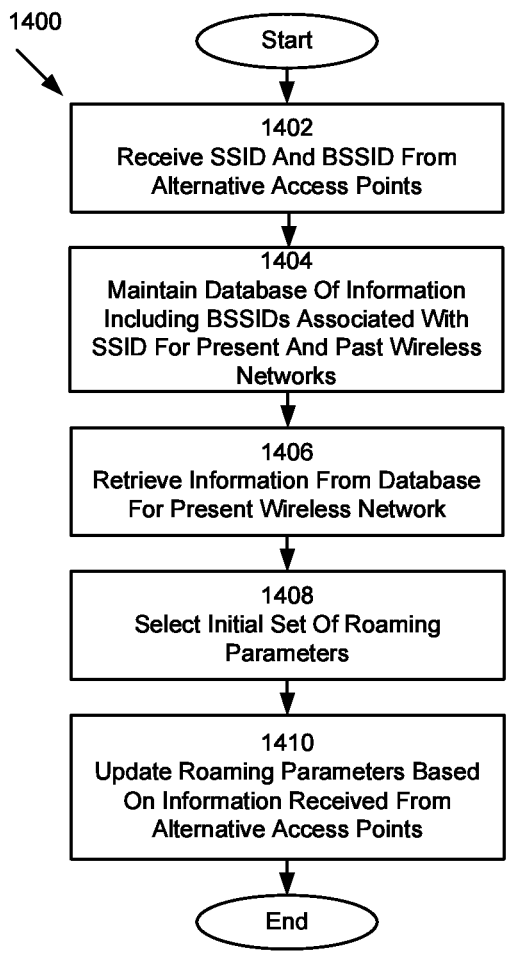

FIG. 14 illustrates a method 1400 to adapt roaming parameters for a mobile wireless device 102. In step 1402, the mobile wireless device 102 receives an SSID and a BSSID from one or more alternative access points 104. Each alternative access point 104 provides at least an SSID and a BSSID to the mobile wireless device 102. In step 1404, the mobile wireless device 102 maintains a database of BSSID associated with SSID for a set of wireless networks to which the mobile wireless device 102 is connected presently and has connected with previously. In step 1406, the mobile wireless device 102 retrieves information from the database to select an initial set of roaming parameters for the mobile wireless device 102 in step 1408. In step 1410, the mobile wireless device 102 updates the roaming parameters based on information received from the alternative access points 104. In a representative embodiment, the mobile wireless device 102 categorizes a wireless network environment type for each SSID in the database based on the number of BSSID associated with the SSID per radio frequency band. The network environment types include a "sparse" environment type having a number of BSSID fewer than or equal to a positive integer and a "dense" environment type having a number of BSSID greater than the positive integer. The mobile wireless device 102 adapts the roaming parameters based on the categorization for the current access point to which the mobile wireless device is connected.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of adapting roaming in a mobile wireless device in communication with a wireless network, the method comprising:
   at the mobile wireless device:
      detecting a wireless network type for the wireless network to which the mobile wireless device is connected; and
      adjusting one or more roaming parameters based on the detected wireless network type,
      wherein:
         the wireless network type is characterized by a service set identifier and a number of unique basic service set identifiers associated with the service set identifier per radio frequency band;
         when the number of basic service set identifiers associated with the service set identifier is one per radio frequency band, the adjusting one or more roaming parameters causes the mobile wireless device to scan for and roam to alternative access points less frequently by decreasing a receive signal strength threshold and increasing a receive signal strength difference threshold;
         when the number of basic service set identifiers associated with the service set identifier is more than one per radio frequency band, the adjusting one or more roaming parameters causes the mobile wireless device to scan for and roam to alternative access points more frequently by increasing the receive signal strength threshold and decreasing the receive signal strength difference threshold;
         when a receive signal strength of an access point in the wireless network to which the wireless device is connected falls below the receive signal strength threshold, the mobile wireless device searches for alternative access points to which to connect; and
         when a difference between a receive signal strength of an alternative access point and the receive signal strength of the access point in the wireless network to which the mobile wireless device is connected exceeds the receive signal strength difference threshold, the mobile wireless device roams to the alternative access point.

2. The method as recited in claim 1, further comprising:
   at the mobile wireless device:
      adjusting a time interval between successive scans for alternative access points based on the detected wireless network type.

3. A method to adapt roaming parameters in a mobile wireless device, the method comprising:
   when the mobile wireless device is connected to a current access point of a wireless local area network (WLAN):
      retrieving, from memory, information for the current access point;
      selecting one or more roaming parameters for the mobile wireless device based on the retrieved information for the current access point;
      scanning for alternative access points in accordance with the selected one or more roaming parameters;
      receiving information from one or more located alternative access points;
      determining a WLAN type for the one or more located alternative access points;
      storing the received information and the determined WLAN type for the one or more located alternative access points; and
      updating the stored information for the current access point,
      wherein the WLAN type includes at least a first WLAN type comprising a single basic service set identifier per service set identifier per radio frequency band and a second WLAN type comprising multiple basic service set identifiers per service set identifier per radio frequency band, and
      wherein the mobile wireless device selects the one or more roaming parameters to cause the mobile wireless device to scan for and roam to alternative access points:
         less frequently, by decreasing a receive signal strength threshold and increasing a receive signal strength difference threshold, when the current access point is of the first WLAN type, and
         more frequently, by increasing the receive signal strength threshold and decreasing the receive signal strength difference threshold, when the current access point is of the second WLAN type.

4. The method as recited in claim 3, wherein the WLAN type further includes a third WLAN type comprising two basic service set identifiers per service set identifier per radio frequency band and a fourth WLAN type comprising more than two basic service set identifiers per service set identifier per radio frequency band.

5. The method as recited in claim 3, wherein the scanning includes passively scanning for the alternative access points by changing a receive radio frequency channel and receiving radio frequency beacons transmitted periodically by the alternative access points.

6. The method as recited in claim 3, wherein the scanning includes actively scanning for the alternative access points by transmitting a request having a specific service set identifier and subsequently listening for replies from alternative access points having a matching service set identifier.

7. The method as recited in claim 3, wherein the scanning includes actively scanning for the alternative access points by transmitting a request having a broadcast service set identifier and subsequently listening for replies from any alternative access points.

8. A mobile wireless device comprising:
   at least one transceiver;
   a processor to control roaming of the mobile wireless device; and
   a non-volatile memory to store access point information that includes a number of distinct basic service set identifiers associated with a service set identifier for each access point;
   wherein the processor is configured to cause the mobile wireless device to:

retrieve access point information from the non-volatile memory for a current access point with which the mobile wireless device is associated; and set roaming parameters for the mobile wireless device based on the retrieved access point information for the current access point such that the mobile wireless device scans for and roams to alternative access points:

more frequently when the number of distinct basic service set identifiers associated with the service set identifier for the current access point exceeds a positive integer, and less frequently when the number of distinct basic service set identifiers associated with the service set identifier for the current access point does not exceed the positive integer, wherein the roaming parameters include a receive signal strength threshold and a receive signal strength difference threshold, and the processor sets the roaming parameters to cause the mobile wireless device to scan for and roam to alternative access points less frequently by decreasing the receive signal strength threshold and increasing the receive signal strength difference threshold and more frequently by increasing the receive signal strength threshold and decreasing the receive signal strength difference threshold.

9. The mobile wireless device as recited in claim 8, wherein the processor is further configured to cause the mobile wireless device to:

calculate a roaming success rate for roaming to an alternative access point; and adjust the roaming parameters dynamically based on the calculated roaming success rate.

10. The mobile wireless device as recited in claim 9, wherein the processor is further configured to cause the mobile wireless device to adjust the roaming parameters to achieve a roaming success rate less than 90 percent.

11. The mobile wireless device as recited in claim 10, wherein the access point information stored in the non-volatile memory includes a received signal strength, and the processor is further configured to cause the mobile wireless device to adjust the roaming parameters based on a measured difference in received signal strength between a current access point to which the mobile wireless device is connected and an available access point having the highest received signal strength.

12. The mobile wireless device as recited in claim 11, wherein the processor is further configured to cause the mobile wireless device to adjust the roaming parameters to achieve a measured difference in received signal strength of less than 20 percent.

13. A non-transitory computer program product encoded in a non-transitory computer readable medium for adapting roaming in a mobile wireless device, the non-transitory computer program product comprising:

computer program code for receiving information from alternative access points including at least a service set identifier and a basic service set identifier for each alternative access point;

computer program code for maintaining a database of basic service set identifiers associated with service set identifiers for wireless networks to which the mobile wireless device is connected presently and has connected with previously;

computer program code for retrieving information from the database to select an initial set of roaming parameters for the mobile wireless device;

computer program code for updating the roaming parameters based on information received from alternative access points;

computer program code for categorizing a wireless network environment type for each service set identifier in the database based on the number of basic service set identifiers associated with the service set identifier, the wireless network environment type including a sparse environment having a number of basic service set identifiers fewer than or equal to a positive integer and a dense environment having a number of basic service set identifiers greater than the positive integer; and computer program code for adapting the roaming parameters based on the categorized wireless network environment type for a current access point to which the mobile wireless device is connected, wherein the roaming parameters include a receive signal strength threshold and a receive signal strength difference threshold, and the roaming parameters for the mobile wireless device are selected to cause the mobile wireless device to scan for and roam to alternative access points less frequently by decreasing the receive signal strength threshold and increasing the receive signal strength difference threshold and more frequently by increasing the receive signal strength threshold and decreasing the receive signal strength difference threshold.

14. The non-transitory computer program product as recited in claim 13, further comprising:

computer program code for adapting the roaming parameters based on a frequency of successful roaming to alternative access points.

15. The non-transitory computer program product as recited in claim 13, further comprising:

computer program code for decreasing a frequency of roaming to alternative access points when the current access point is in a sparse environment; and computer program code for increasing the frequency of roaming to alternative access points when the current access point is in a dense environment.

16. The non-transitory computer program product as recited in claim 13, further comprising:

computer program code for adapting the roaming parameters to achieve a frequency of successful roaming in a range between 75 percent and 95 percent and a difference in received signal strength between a current access point to which the mobile wireless device is connected and a previous access point to which the mobile wireless device was connected most recently to less than 20 dB.

* * * * *